United States Patent
Dick et al.

(10) Patent No.: US 9,493,031 B2
(45) Date of Patent: Nov. 15, 2016

(54) VEHICLE WHEEL

(75) Inventors: Stephan Dick, Heinsdorfergrund (DE);
Mike Seidel, Falkenstein (DE); Veit Wuerfel, Lichtenstein (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 818 days.

(21) Appl. No.: 13/532,302

(22) Filed: Jun. 25, 2012

(65) Prior Publication Data

US 2013/0020856 A1    Jan. 24, 2013

(30) Foreign Application Priority Data

Jul. 21, 2011   (DE) .................. 10 2011 079 599

(51) Int. Cl.
| B60B 7/06 | (2006.01) |
| B60B 3/02 | (2006.01) |
| B60B 3/10 | (2006.01) |
| B60B 7/04 | (2006.01) |

(52) U.S. Cl.
CPC . B60B 3/02 (2013.01); B60B 3/10 (2013.01); B60B 7/04 (2013.01); B60B 7/065 (2013.01); B60B 2310/318 (2013.01); B60B 2360/342 (2013.01); B60B 2900/111 (2013.01); B60B 2900/1216 (2013.01); B60B 2900/513 (2013.01)

(58) Field of Classification Search
CPC ............. B60B 7/00; B60B 7/04; B60B 7/06; B60B 7/065
USPC .............. 301/37.101, 37.11, 37.106, 37.107
See application file for complete search history.

(56) References Cited

U.S. PATENT DOCUMENTS

| 6,805,413 | B2 * | 10/2004 | Fitzgerald ............... 301/37.106 |
| 8,382,211 | B2 * | 2/2013 | Renius et al. ........... 301/37.102 |
| 2011/0291465 | A1 * | 12/2011 | Peschiutta et al. ...... 301/37.102 |
| 2013/0307321 | A1 * | 11/2013 | Mengle et al. .......... 301/37.107 |

FOREIGN PATENT DOCUMENTS

| CN | 102336117 A | 2/2012 |
| CN | 202213431 U | 5/2012 |
| DE | 20 2009 008 508 U1 | 10/2009 |
| DE | 10 2009 024 792 A1 | 12/2010 |
| DE | 20 2009 013 418 U1 | 3/2011 |
| GB | 293 128 A | 7/1928 |
| GB | 2 259 891 A | 3/1993 |
| JP | 2003-118302 A | 4/2003 |
| JP | 2009-119955 A | 6/2009 |
| WO | WO 99/39924 A1 | 8/1999 |
| WO | WO 2011/006033 A2 | 1/2011 |

OTHER PUBLICATIONS

Machine translation of JP 2003-118302, entire document.*

(Continued)

*Primary Examiner* — Jason Bellinger
(74) *Attorney, Agent, or Firm* — Crowell & Moring LLP

(57) ABSTRACT

A vehicle wheel has a rim and spokes supporting the rim on a hub section. A clearance is formed between two mutually adjacent spokes and is covered by a flat covering element. In this case, the covering element, which is assigned to only one such clearance, is made of a fiber-reinforced synthetic material and, on an exterior side of the wheel, is glued onto the spokes which, on their mutually facing edges, have a slight step toward the interior side of the wheel, as well as onto the hub section which, in the area of this clearance on its side facing the rim, also has such a slight step. Not all clearances between two mutually adjacent spokes of the vehicle wheel are covered in such a manner.

5 Claims, 1 Drawing Sheet

(56) References Cited

OTHER PUBLICATIONS

Machine translation of DE 202009013418, entire document.*
German Search Report dated May 2, 2012 with partial English translation (ten (10) pages).

Chinese-language Office Action issued in counterpart Chinese Application No. 201210229122.9 dated May 27, 2015, with English translation (Thirteen (13) pages).
Chinese-language 2$^{nd}$ Office Action issued in counterpart Chinese Application No. 201210229122.9 dated Mar. 25, 2016, with English translation (Nine (9) pages).

* cited by examiner

VEHICLE WHEEL

CROSS-REFERENCE TO RELATED APPLICATION

This application claims priority under 35 U.S.C. §119 from German Patent Application No. DE 10 2011 079 599.5, filed Jul. 21, 2011, the entire disclosure of which is herein expressly incorporated by reference.

BACKGROUND AND SUMMARY OF THE INVENTION

The invention relates to a vehicle wheel having a rim and spokes supporting the rim on a hub section, a clearance between two mutually adjacent spokes being covered by a flat covering element. With respect to the state of the art, reference is made, for example, to German Patent document DE 10 2009 024 792 A1.

Many different demands are made on wheels of vehicles, particularly on those of passenger cars. In addition to an obviously sufficient stability while maintaining a low weight, the wheels should promote a good drag coefficient of the vehicle and stand out with a pleasant visual appearance, which also includes the fact that the visible outer area of the wheels should not be soiled to much of an extent by the abraded particles of the wheel brakes provided on the interior side of the wheels. In order to ensure the latter, it is known to cover the clearances between all spokes by use of a single disk-shaped covering element with respect to the brake disk of the wheel brake rotating together with the wheel, which covering element is provided on the interior side of the wheel. However, this measure considerably restricts the cooling of the wheel brake or of its brake disk.

There is therefore needed a vehicle wheel characterized by an improvement in its drag coefficient, while ensuring a sufficient cooling of the wheel brake, and which has a light weight construction. This and other objects are met by a vehicle wheel having a rim and spokes supporting the rim on a hub section, a clearance between two mutually adjacent spokes being covered by a flat covering element. The covering element assigned to only one such clearance is made of a fiber-reinforced synthetic material and, on an exterior side of the wheel, is glued onto the spokes which, on their mutually facing edges, have a slight step toward the interior side of the wheel, as well as onto the hub section which, in the area of the clearance on its side facing the rim, also has such a slight step. Not all clearances between two mutually adjacent spokes are covered in such a manner.

According to an advantageous further aspect, the covering element can be fastened in a comparable manner to the corresponding rim section, and the spokes can be arranged such that a clearance extending over a larger angular segment alternates with a clearance extending over a smaller angular segment, only the larger clearances being covered by covering elements.

Because not all clearances are covered, a sufficient cooling of the wheel brake can be easily provided. In addition to the effect of a reduced soiling, an improved drag coefficient can be obtained in that a portion of the clearances are on the exterior side of the wheel. As a result of the fact that the covering element is constructed of a fiber-reinforced synthetic material, this wheel is characterized by high stability while its weight is low. Simultaneously, an interesting visual appearance is obtained when the weave structure of the fiber composite material is visible on the surface of the covering element.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
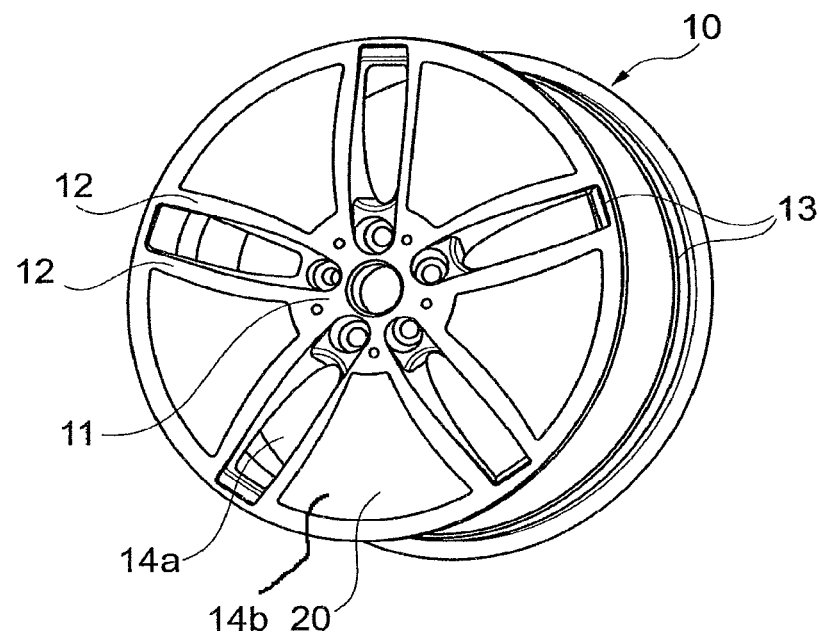
FIG. 1 is an exterior perspective view of an exemplary wheel according to the invention.

In FIG. 1, reference number 10 indicates the actual wheel body of a vehicle wheel, which is constructed of a light-metal alloy and consists of a hub section 11, several (here, ten) spokes 12 and a rim 13 which, as is customary, is supported by way of the spokes 12 on the hub section 11.

As illustrated, in this case, the spokes 12 are arranged such that a clearance 14a extending over a smaller angular segment (of, in this case, approximately 10°) between two mutually adjacent spokes 12 alternates with a clearance 14b extending over a larger angular segment (of, in this case, approximately 60°) between two mutually adjacent spokes 12. Each of the larger clearances 14b is covered by a flat covering element 20. The covering element 20 is dimensioned such that, with the exception of its edge area, with which, as will be explained in the following, it rests in sections on the spokes 12 bounding the clearance 14b as well as part of the hub section 11, the entire clearance 14b is covered. Considering the entire face or exterior side of the wheel, a large portion of this surface is therefore covered by the covering elements 20 covering the larger clearances 14b. Only by way of the relatively small clearances 14a, can abraded particles from the brakes situated on the interior side of the wheel, and therefore dirt, now arrives on the exterior side of the wheel, so that the soiling will clearly be reduced compared to a spoke wheel without such covering elements. Simultaneously, by way of these still open clearances 14a, heat occurring during braking can be removed to the outside.

By way of gluing or otherwise bonding, the covering element 20 is fastened to the spokes 12 bounding the respective clearance 14b as well as to the part of the hub section 11 bounding the respective clearance 14b. This reliable and durable fastening method is advantageous, on the one hand, because no separate fastening elements are required; on the other hand, this fastening method is favorable with respect to the preferably used materials. Specifically, in order to create a wheel which has a weight that is as low as possible and withstands all occurring forces, the wheel body 10 is constructed of a light-metal alloy, preferably of an aluminum alloy, and the covering element 20 consists of a carbon-fiber reinforced synthetic material (CFK). Contact corrosion could occur between the two above-mentioned materials, which can be reliably prevented by an intermediate layer of a suitable adhesive. For this reason, such an adhesive (or another differently suitable releasing agent) may or should be provided also in the transition area between the covering element 20 and the rim 12 for preventing contact corrosion.

Figure 2:
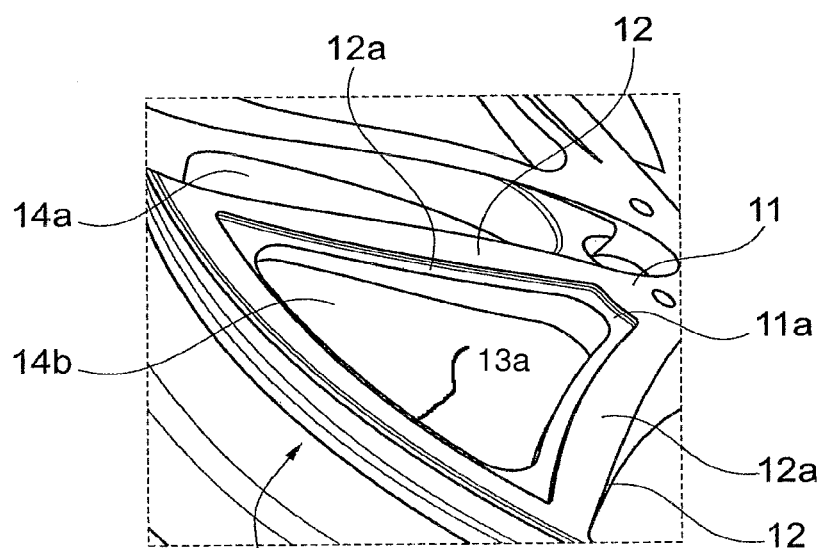
FIG. 2 is an enlarged cutout view of a large clearance situated between two spokes of the vehicle wheel without the covering according to the invention being provided.

So that, with respect to the spokes 12 bounding the respective clearance 14b as well as the pertaining hub section 11, the covering element 20 can easily be positioned during the manufacturing process of the wheel, i.e. during the gluing-on, the spokes 12 have a slight step 12a toward the interior side of the wheel on their edge facing the clearance 14b or facing one another, as illustrated in FIG. 2. In the same fashion, a corresponding step 11a or gradation 11a is provided at the hub section 11 at its edge facing the clearance 14b or the rim 13. In this case, the depth of these steps 11a, 12a or gradations is dimensioned such that the covering element 20 then glued on by way of the intermediate layer of above-mentioned adhesive adjoins the not gradated area of the spokes 12 or of the hub section 11 in an essentially flush manner with its exterior surface. This measure has an extremely advantageous effect on the drag coefficient of a vehicle equipped with such corresponding wheels.

In the same manner, the covering element 20 can naturally also be fastened to the section of the rim 13 facing the respective clearance 14b, which rim 13 may therefore, in sections, have a comparable step or gradation 13a. When the covering element 14 is designed in a suitable fashion, it can additionally transmit forces between the rim 13 and the hub section 11 and can thereby provide additional support for the rim 13 at the hub section 11, in addition to the support provided by the spokes 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle wheel, comprising:
   a hub section;
   a rim;
   a plurality of spokes supporting the rim on the hub section, clearances being provided between two mutually adjacent ones of the plurality of spokes; and
   at least one fiber-reinforced synthetic material covering element operatively configured to cover only a single clearance between two mutually adjacent spokes;
   wherein the two mutually adjacent spokes comprise a stepped section toward an interior side of the vehicle wheel, and the hub section comprises a stepped section on a side facing the rim in the area of the clearance;
   wherein the covering element is secured onto the stepped sections in order to cover the clearance;
   wherein at least one additional clearance between two other mutually adjacent spokes are not covered with a covering element;
   wherein the plurality of spokes are arranged such that a clearance extending over a large angular segment of the vehicle wheel alternates with a clearance extending over a smaller angular segment of the vehicle wheel; and
   wherein only said clearances extending over the larger angular segments are covered by respective covering elements.

2. The vehicle wheel according to claim 1, wherein the covering element is secured onto the spokes by an adhesive bonding.

3. The vehicle wheel according to claim 2, wherein the adhesive bonding is carried out with a glue.

4. The vehicle wheel according to claim 1, wherein the covering element is further secured onto a section of the rim facing the respective clearance, said rim section having a comparable stepped section for securing the covering element.

5. The vehicle wheel according to claim 1, wherein the covering element is structurally configured to transmit forces between the rim and the hub section and to provide support for the rim at the hub section, in addition to the support provided by the plurality of spokes.

* * * * *